Patented May 2, 1933

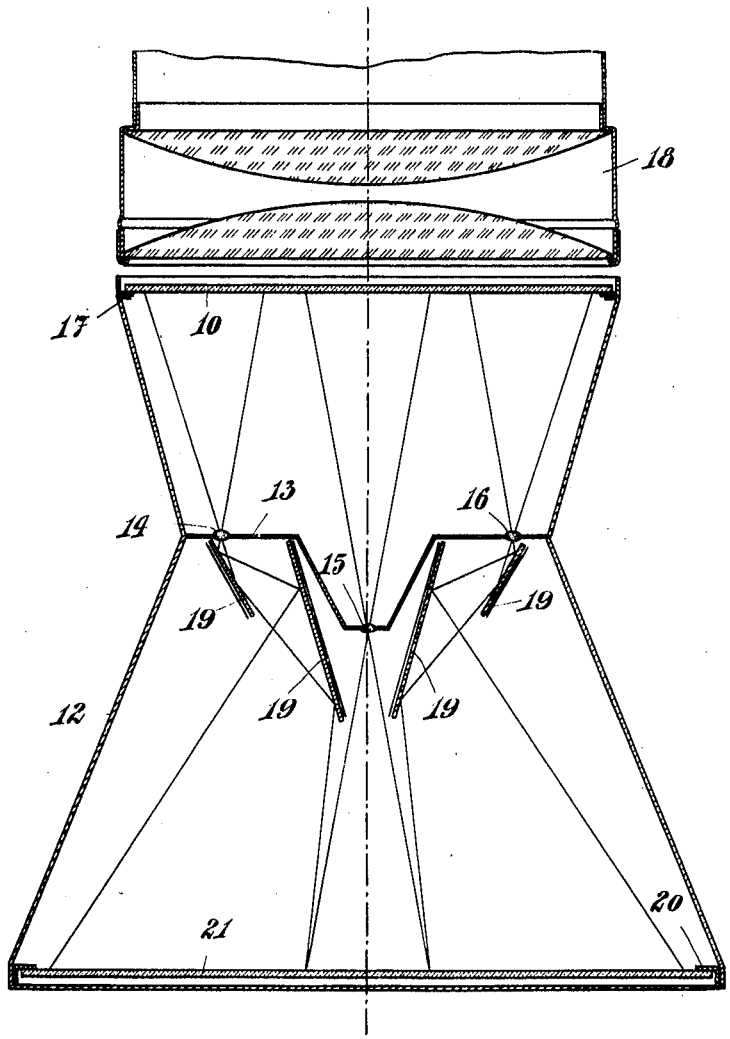

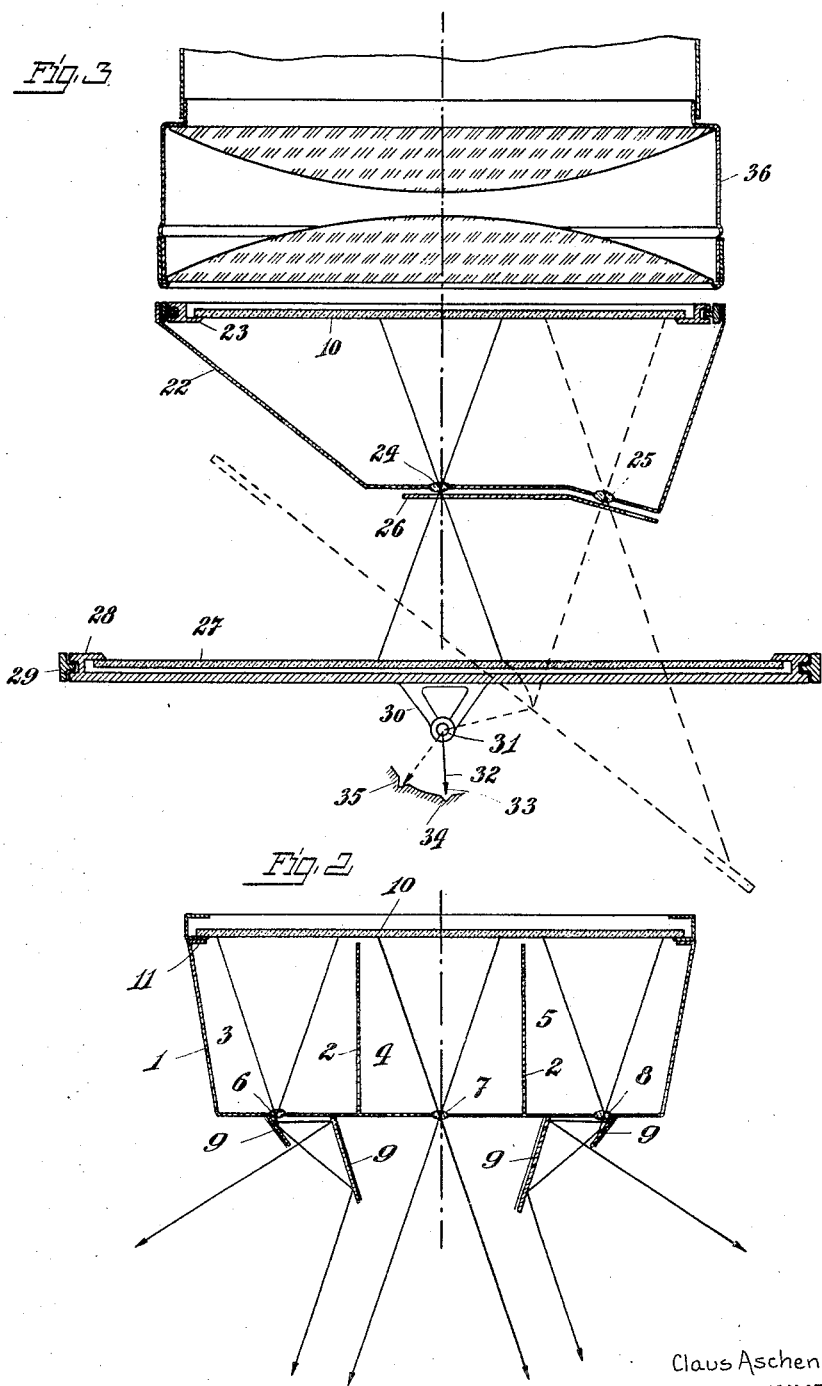

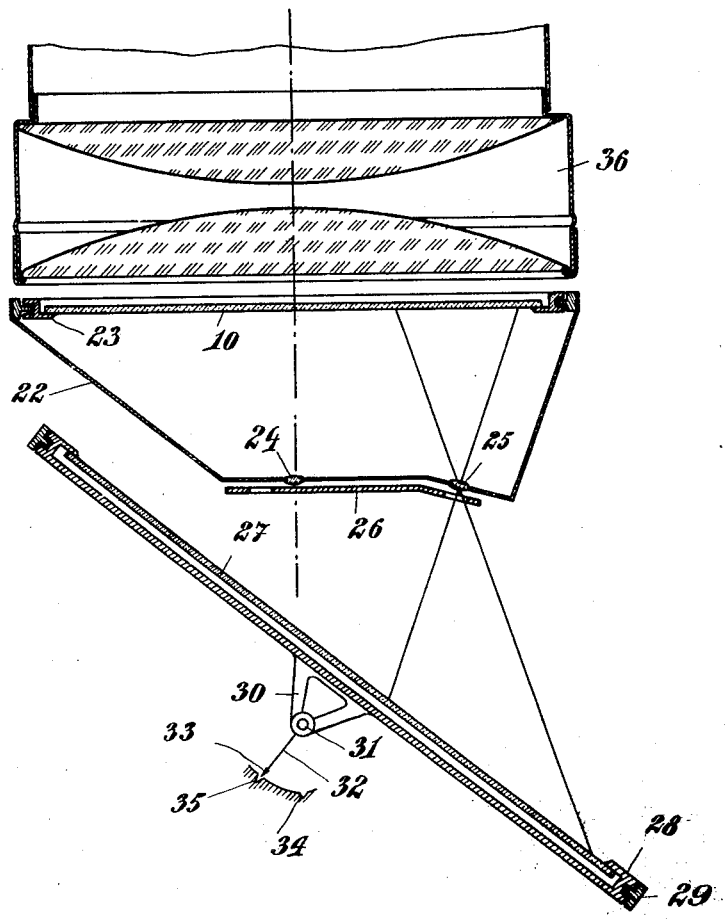

1,906,509

UNITED STATES PATENT OFFICE

CLAUS ASCHENBRENNER, OF MUNICH, GERMANY, ASSIGNOR TO FIRM PHOTOGRAMMETRIE G. M. B. H., OF MUNICH, GERMANY

CORRECTION FOR DISTORTION THE COMPONENT PICTURES PRODUCED FROM DIFFERENT PHOTOGRAPHIC REGISTERING DEVICES

Application filed February 27, 1930, Serial No. 431,678, and in Germany January 17, 1928.

In photographic surveying, particularly from aircraft, multiple cameras are used for enlarging the field of vision, these cameras taking exposures in various directions with one simultaneous release of the shutter. In these cameras, by interposing reflecting surfaces in the path of the rays in one or more of the separate cameras, all images produced are projected on a common plane, so that upon the exposure being made, all the component images are taken together on a single composite flat sensitive surface (photographic plate or film and hereinafter called the impression plate).

The correction from distortion of exposures made in this way, has been accomplished hitherto by each component picture being corrected for distortion on a separate sensitive surface (plate, film, sensitized paper), whereupon the corrected component pictures so obtained had to be subsequently combined to a unitary wide angle picture. In contrast to this method, according to the present invention the correction of all component pictures takes place on a single sensitive surface (plate, film, sensitized paper, hereinafter called the reproducing plate), care being taken that the component pictures automatically come into the proper mutual position, so that after the exposure and developing of the reproducing plate, a unitary wide angle picture is produced.

The invention will be better understood by referring to the accompanying drawings, in which Figure 1 is a diagrammatic view of a form of construction of applicant's rectifier; Figure 2 shows a diagrammatic view of a multiple lens camera adapted to take a series of pictures in different directions upon a single sensitive plane; Figure 3 shows diagrammatically another style of construction of applicant's rectifier; and Figure 4 shows diagrammatically the style of construction illustrated in Figure 3, except that it is taken in another position.

Figure 1 shows an example of a device for carrying out the method, according to which all component images produced for instance by a triple camera of the type shown in Fig. 2, are corrected simultaneously. The triple camera in Fig. 2 comprises a rigid body portion 1, which is divided by light-tight partitions 2 into three component cameras 3, 4, 5 having lenses 6, 7, 8, the middle lens 7 serving to photograph the portion of 1 and directly underneath, whilst by interposing reflecting surfaces 9 in the path of the rays of the side lenses 6 and 8, it is made possible for the latter to take the sections of land situated left and right of the central portion taken by the middle lens. The direction of exposure of the left and right hand lens therefore runs obliquely downwards and to the left and right respectively. The component images produced by the three lenses 6, 7, 8, thus come together in one single plane, in which they are photographed by the impression plate 10. The latter is placed in a frame 11, which as usual is provided with suitable marks, which determine the position of the plate in the camera.

The device according to the invention and as shown in Fig. 1 consists of a light-tight casing 12, which is divided by a partition 13. In this partition, there are arranged three lenses 14, 15, 16 corresponding to those belonging to the triple camera above mentioned. In the top portion of the casing 12 there is a holding frame 17, which is provided with the same marks as in the holding frame of the appurtenant photographing apparatus (11 in Fig. 2). By means of suitable adjusting devices, the developed impression plate 10 may be so laid in this holding frame, that the marks of the photographing apparatus recorded on it, correspond to the marks of the frame 17. A suitable exposure device 18 is arranged above the impression plate 10. Through the lenses 14, 15, 16, the two outer ones of which 14 and 16 have reflecting surfaces 19 connected in front of them, the three component pictures of the impression plate 10, are projected, corrected from distortion, on to the reproducing plate 21 pressed against the holding frame arranged at the bottom of the apparatus. In the example shown the images are projected on to the plane of the central picture, which is recorded in natural size through the respective lens 15. The interposing of the reflecting faces 19 in the plane of the rays of light of the two side lenses 14 and 16, does away with the tilting of the plane of reproduction with respect to the plane of the impression plate. The focal lengths of the lenses 14 and 16 and the inclinations of the reflecting surfaces 19 are so adjusted that the correction of the side images takes place at the right perspective and that they agree in scale with the projection of the middle picture. By suitably adjusting the position of the lenses 14 and 16 with respect to the impression plate 10, it is arranged that the correction of the side pictures also comes in the proper position with respect to the projection of the central picture, in the present case so that the corrected component pictures directly adjoin the centre picture, so that a unitary composite picture arises on the reproducing plate.

Figs. 3 and 4 show another modification of the device according to the invention, wherein the correction of the component images takes place not simultaneously but in succession. A fixed casing 22 carries the supporting frame 23 which this time may be rotated or turned round in its own plane. In the frame is placed the impression plate which as before is provided with marks for adjusting it. In the front of the casing are two lenses 24, 25 which by means of a sliding shutter 26, may be released alternately. The reproducing plate 27 rests against the supporting frame 28, which can be turned round in its own plane in a grooved ring 29. The grooved ring 29 is rigidly connected to a bearing 30 and may be tilted about the axis 31. Rigidly connected to the bearing 30 is a lever 32, which is provided at one end with a catch 33 which engages in notches 34, 35, thus holding the ring 29 together with the frame 28 in certain positions. Similarly, the two supporting frames 23 and 28 are provided with notches which ensure the two frames being turned by equal amounts. Just as in the apparatus described previously, an exposure device 36 is again arranged over the impression plate.

The process of correcting the distortion is as follows: After the impression plate 10 has been properly positioned with the aid of the marks in the supporting frame 23, the ring 29, carrying the reproducing plate is arranged parallel to the impression plate 10 by snapping the lever 32 in the notch 34. In this position the sliding shutter 26 uncovers the middle lens 24 and covers the side lens 25. By releasing the shutter of the lens 24, the central image on the impression plate is transferred in natural size to the centre of the reproducing plate 27. Now with the position of both plates 10 and 27 unaltered in their frames 23 and 28 and with the latter in their respective holding rings, the entire portion 28, 29, 30 carrying the reproducing plate, is tilted about the axis 31, by placing the lever 32 in the notch 35. This position is shown dotted in Fig. 3 and separately in full in Fig. 4. In this position, the sliding shutter 26 uncovers the side lens 25 and covers the central lens 24. The axis of rotation is so chosen that by rotating, the edge of the middle picture comes immediately against the edge of the side picture which is projected free from distortion on to the reproducing plate through the lens 25. Now the revolving frame 23 and also the revolving frame 28 of the reproducing plate are turned by 180 deg. The setting of this angle is brought about automatically by snapping into notches, which are arranged in the revolving frames. The original left-hand component picture, thus comes into the position formerly occupied by the right-hand component picture and by again releasing the shutter of the lens 25, it is in turn projected freed from distortion in the proper position alongside the central picture. In this way, all the component pictures on the impression plate, are brought into the proper position and corrected for distortion, on a single sensitive surface, (the reproducing plate).

The device according to the invention in the forms described may be applied to multiple cameras with any number of lenses, particularly even for cameras with a central lens and a plurality of lateral lenses, which surround the centre one as it were in a ring, so that a closed belt of land is photographed, and after correction a complete picture after the manner of a wide angle photograph is produced on a common plane of registration. In the event of such an arrangement, the examples shown would have to be considered as a main section taken from a symmetrical polygonal arrangement, repeating itself in all planes, through the axis of the central lens and a side lens.

What I claim is:

1. A device for rectifying distortion of a photograph consisting of a plurality of partial pictures taken on a single sensitive surface by a multiple lens camera, which comprises a stationary frame for holding the plate bearing the pictures to be rectified, a second stationary frame opposite to the former frame for holding a sensitive plate to receive the rectified picture, a light source to project the rectifying picture on the said second plate and reflecting means interposed between said two frames for changing the angle of incidence of the rays originated from said light source upon the said sensitive plate to produce rectification, whereby the rectification of a series of partial pictures is effected by positioning said means for changing the angle of incidence of said rays.

2. A device, as claimed in claim 1, comprising a plurality of lenses intermediate the said two frames, the said means for changing the angle of incidence of said rays being interposed between the said lenses and the second frame, said lenses being adapted to concentrate the rays originated from said light source upon the said adjustable reflecting surfaces, the latter controlling the angle of incidence of said rays upon the second plate, whereby rectification is obtained.

In testimony whereof I hereunto affix my signature.

CLAUS ASCHENBRENNER.